(No Model.)

J. D. KIOUS.
FLAT IRON HEATER.

No. 407,355. Patented July 23, 1889.

WITNESSES
M. B. Harris
V. F. Bernhard

INVENTOR
Jasper D. Kious
By Edson Bros,
Attorneys.

UNITED STATES PATENT OFFICE.

JASPER D. KIOUS, OF OXFORD, INDIANA.

FLAT-IRON HEATER.

SPECIFICATION forming part of Letters Patent No. 407,355, dated July 23, 1889.

Application filed September 26, 1888. Serial No. 286,448. (No model.)

*To all whom it may concern:*

Be it known that I, JASPER D. KIOUS, a citizen of the United States, residing at Oxford, in the county of Benton and State of Indiana, have invented certain new and useful Improvements in Flat-Iron Heaters; and I do hereby declare the following to be a full, clear, and exact description of the invention, such as will enable others skilled in the art to which it appertains to make and use the same.

My invention relates to improvements in heaters for flat-irons; and it consists of the peculiar construction and arrangement of parts, as will be hereinafter fully described, and particularly pointed out in the claims.

The object of my invention is to provide a heater for flat-irons which is adapted to be placed over one of the holes of a cooking-stove, or a gas or oil stove, and which is constructed to receive within itself a number of irons, thus economizing space and heating all of the irons within it at one time.

A further object of my invention is to provide the heater with a heat radiating and distributing contrivance arranged centrally within the closed shell or drum to radiate and distribute the heat directly against the vertical contiguous faces of the bottoms of the flat-irons, which are placed on end within the shell or drum; and, further, to provide means for regulating the escape of the air in the chamber of said drum.

Figure 1:
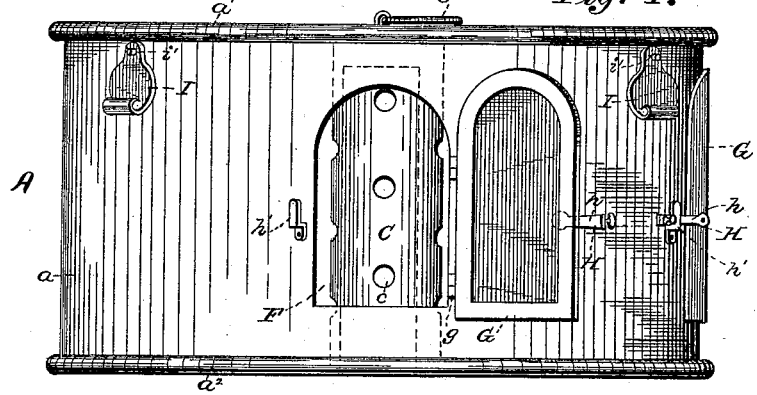
Figure 2:
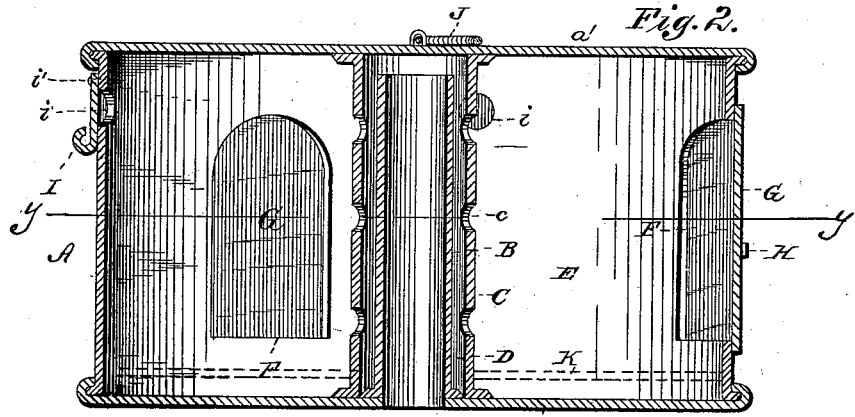
Figure 3:
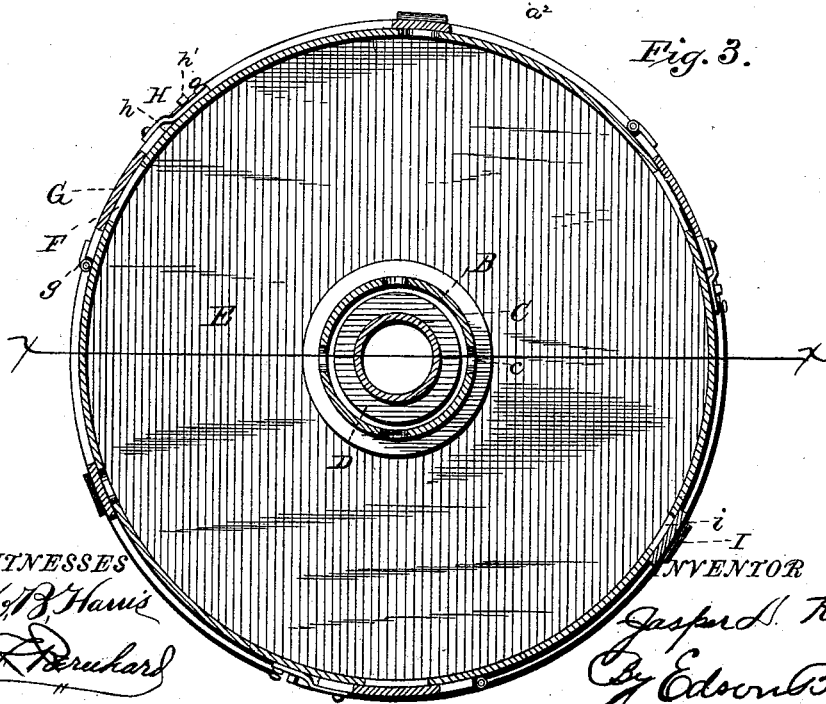

In the accompanying drawings, Figure 1 is a side elevation of a flat-iron heater embodying my invention. Fig. 2 is a vertical central sectional view on the line $x\,x$ of Fig. 3, and Fig. 3 is a horizontal section view on the line $y\,y$ of Fig. 2.

Like letters of reference denote corresponding parts in all the figures.

A is the shell or case of my improved flat-iron heater, which shell consists, essentially, of a vertical wall $a$ and an imperforate top $a'$ and an imperforate bottom $a^2$, all of which are securely joined or connected together in any suitable well-known manner. This shell may be made cylindrical, as shown in the accompanying drawings; but the shape thereof is immaterial and can be varied and changed at pleasure without departing from the spirit of my invention.

B is a central imperforate tube, which is erected vertically in the middle of the shell, and the lower end of this imperforate tube opens through the bottom $a^2$ of the shell, to which said tube is firmly secured, the upper end of the tube being left open and terminating a short distance from the top $a'$ of the shell to leave a space through which the ascending heat can escape into a perforated distributing-tube C. By providing this imperforate tube B, which opens through the bottom of the shell and terminates at its upper end a short distance below the top of the shell, I provide means for creating a suction or draft from the stove into the drum, as the heated air is drawn and passes rapidly through the tube and into the drum to be radiated and distributed uniformly therein by the inner perforated tube. This distributing-tube C is of greater diameter than the tube B, and it is arranged concentrically around said imperforate tube B to leave an intermediate space or chamber D, which receives the heat from the upper end of the interior tube. This distributing-tube C is also fixed in place to the top and bottom of the shell, and it has a series or number of openings $c$, through which the heat escapes into the receiving-chamber of the shell or case.

The shell or case A is further provided with a series of openings F, which are spaced at suitable intervals and are made large enough to permit a flat-iron to be passed through the same and placed in the receiving-chamber E. These openings are closed by doors G, which are preferably hinged to the shell or case, as at $g$, and the free ends of the doors are confined in place when the doors are closed by a suitable locking device H. In the present instance I have shown each of these locking devices consisting of a swinging hasp $h$, which is pivoted at one end to the door and confined in a keeper $h'$, fixed to the shell in proximity to one of the openings F therein; but it is obvious that other kinds of locking device can be used in lieu of the one herein shown.

To provide for cooling the heater when it has become too highly heated, I have provided the vertical wall $a$ of the shell A, near the top thereof, with outlet-openings $i$ between the openings F, through which the heated air in the chamber E can escape, and these outlet-openings can be closed by means of plates I, which are pivoted at $i'$ to the shell or case.

The operation of my invention is as follows: The shell or case is placed over one of the openings in the top of an ordinary cooking-stove after the lid of said opening has been removed, or it may be placed over an opening in a gas or oil stove, and the heat, &c., ascends in the imperforate interior tube and then passes into and through the perforate tube to the receiving-chamber E of the shell, thereby thoroughly and uniformly heating the shell and its chamber. The flat-irons are introduced into the shell or drum through the series of openings F therein, and they are placed on end or in a vertical position, with the faces of the bottoms thereof contiguous to the perforated tube C, which radiates and distributes the heat directly against said contiguous faces of the flat-irons, whereby the latter are very quickly and uniformly heated. After introducing the flat-irons in the shell or drum the doors thereof are closed and fastened and the irons allowed to remain in the chamber of the shell or drum the necessary length of time. Should the shell become too hot, the valves or plates I can be opened to permit the hot air in the shell to escape therefrom.

The shell is provided with a suitable handle J, by which it can be conveniently carried.

When it is desired to use the heater on a gas or oil stove, the shell is preferably provided with a false bottom, as indicated by dotted lines at K in Fig. 2, to sustain the weight of the irons which are placed thereon, and thus materially strengthen the imperforate bottom $a^2$, which is exposed to the direct heat of the fire.

I would have it understood that I reserve the right to make the heater of any kind of metal and of any size and shape as may be found by experience to best fulfill the demands of the trade.

I am aware of Patent No. 36,213, issued to Q. A. Greene on August 18, 1862, which shows a heat-receiving chamber arranged immediately above and made integral with a fire-pot to receive the heat and other products of combustion directly therefrom, said chamber having a series of vertical spaces in which the flat-irons are introduced, so that said irons are subjected to the heat therein which comes directly from the fire-pot; but such is not my invention. I provide a removable drum, which is to be placed at will over one of the holes in any ordinary cook-stove, either a coal, gas, or gasoline stove, and this drum or shell has a draft-creating and heat distributing or radiating device, which is compactly arranged in the vertical center of the drum. This device comprises the inner imperforate draft-tube B, opening through the bottom of the drum and terminating a short distance below the top of the drum, and the outer perforated distributing and radiating tube C, surrounding the inner tube and concentric therewith. I attach importance to these two tubes arranged and combined in the manner shown and described, as I have found by practical experience, with a drum constructed as specified, that the tubes serve to conduct the heat into the drum and uniformly radiate and distribute the heat directly against the vertical faces of the irons arranged contiguous to the perforated outer tube.

Having thus fully described my invention, what I claim as new, and desire to secure by Letters Patent, is—

1. A flat-iron heater of the class described, consisting of a closed shell having an imperforate bottom and a series of doors in its side, an imperforate draft-tube B, arranged centrally within said shell, opening through the bottom, and terminating a short distance below the top thereof, and a separate perforated concentric tube C surrounding said tube B, whereby the heat is radiated and distributed uniformly from the tube B against the vertical faces of the bottoms of the flat-irons arranged contiguous to said tube B, as and for the purpose described.

2. A flat-iron heater of the class described, consisting of a shell or drum having an imperforate top and bottom and two series of openings F $i$ in its sides, one of the series of openings being closed by doors and the other by valve-plates, substantially as described, a central imperforate draft-tube B, opening through the bottom of the shell and terminating a short distance below the top thereof, and a larger perforated tube C, surrounding said tube B and arranged out of contact therewith, to radiate and distribute the heat uniformly against the flat-irons placed within the shell or drum, as and for the purpose described.

In testimony whereof I affix my signature in presence of two witnesses.

JASPER D. KIOUS.

Witnesses:
JOHN NEWLIN,
WM. D. BURDITT.